United States Patent [19]

Wainwright et al.

[11] Patent Number: 5,088,790
[45] Date of Patent: Feb. 18, 1992

[54] ADJUSTABLE LUMBAR SUPPORT MECHANISM FOR A VEHICULAR SEAT

[75] Inventors: John C. Wainwright, Riverview; Arduino Colasanti, East Detroit, both of Mich.

[73] Assignee: Lear Seating Corporation, Southfield, Mich.

[21] Appl. No.: 526,454

[22] Filed: May 21, 1990

[51] Int. Cl.⁵ .................. A47C 3/00; A47C 25/00
[52] U.S. Cl. ........................ 297/284 C; 297/460
[58] Field of Search ............. 297/284 C, 409, 460, 297/284 R

[56] References Cited

U.S. PATENT DOCUMENTS

| | | | |
|---|---|---|---|
| 4,295,681 | 10/1981 | Gregory | 297/284 |
| 4,657,304 | 4/1987 | Heesch et al. | 297/409 |
| 4,678,230 | 7/1987 | Winkle | 297/284 |
| 4,940,284 | 7/1990 | Nagasaka | 297/284 |
| 4,981,324 | 1/1991 | Zacharkow | 297/284 |

FOREIGN PATENT DOCUMENTS 2035071 6/1980 United Kingdom ............... 297/284

Primary Examiner—James R. Brittain
Assistant Examiner—James M. Gardner
Attorney, Agent, or Firm—Reising, Ethington, Barnard, Perry & Milton

[57] ABSTRACT

An adjustable lumbar support mechanism (20) includes a screw shaft (36) having spaced apart right hand (38) and left hand (40) thread convolutions. A traveling nut (42, 44) is disposed in coacting engagement with each of the right hand (38) and left hand (40) threads for linear movement in opposite directions along the screw shaft (36). A pair of links (50, 58) are pivotally attached to each other and at opposite ends to each of the traveling nuts (42, 44) such that movement of the nuts (42, 44) along the screw shaft (36) laterally displaces the links (50, 58). A pressure applicator (68) is attached to the links (50, 58) by a universal joint connection (66). The screw shaft (36) extends outwardly from the seat (22) to an external hand crank (106). The assembly is disposed in a vehicular seat (22) such that movement of the pressure applicator (68) causes an alteration in the contour of the lumbar region (28) of the seat (22) thereby providing adjustable lumbar support.

22 Claims, 9 Drawing Sheets

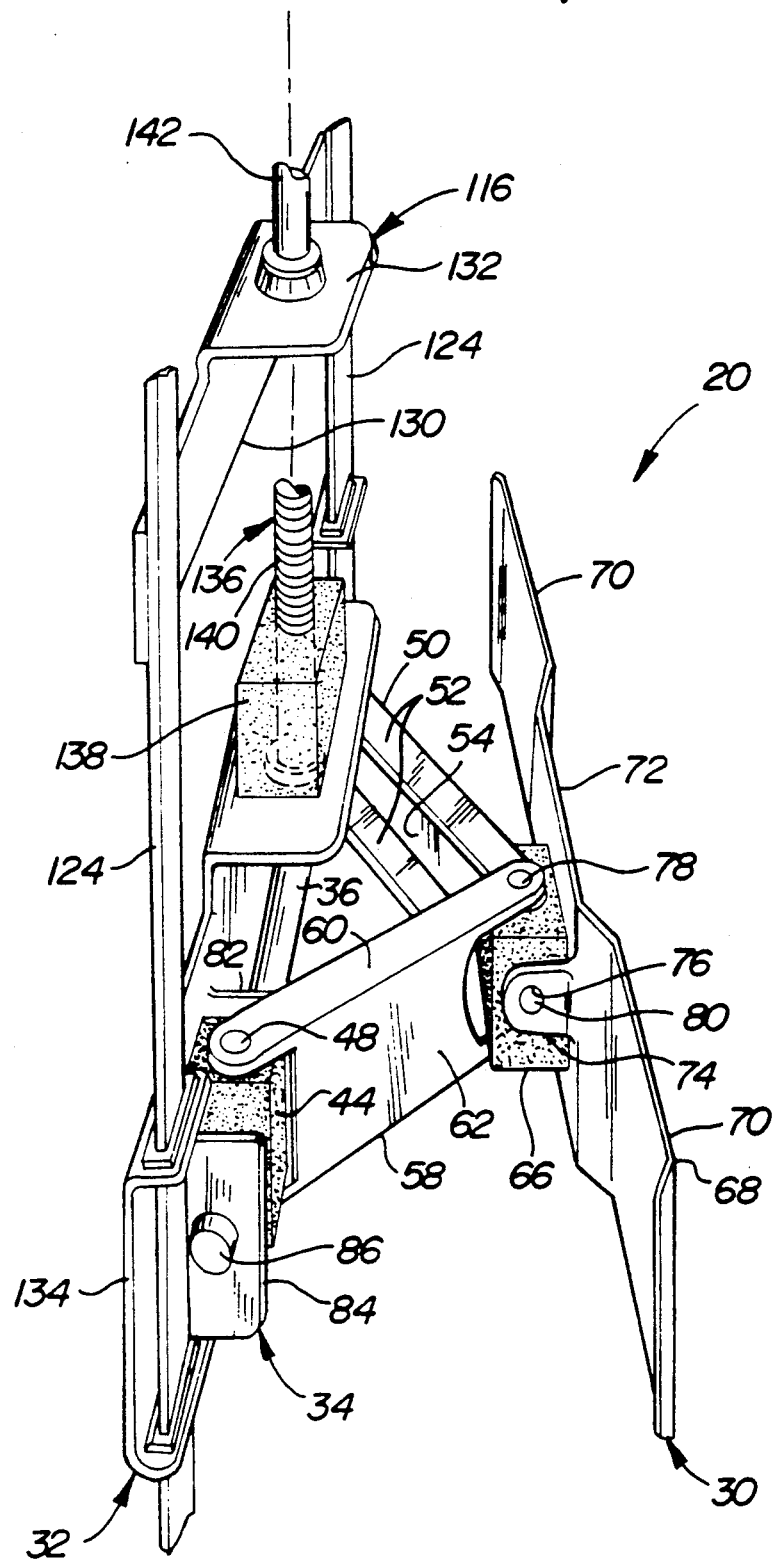

ADJUSTABLE LUMBAR SUPPORT MECHANISM FOR A VEHICULAR SEAT

TECHNICAL FIELD

The subject invention relates to a mechanical adjustable lumbar support assembly disposed in a vehicle seat backrest for altering the contour of the backrest to provide adjustable lumbar support.

BACKGROUND ART

Seats, and more particularly vehicular seats, frequently include an adjustable support assembly for a passenger's back. The adjustable back support assembly is disposed inside the seat and positioned to apply pressure to the lower lumbar region. The lumbar support assembly is made adjustable to accommodate passengers of different body shapes and different support preferences.

One such prior art adjustable lumbar support assembly is shown in the U.S. Pat. No. 4,295,681 to Gregory, issued Oct. 20, 1981. Gregory discloses a manually adjustable lumbar adjustor means disposed within a seat backrest for incrementally adjusting the contour of the backrest to provide a variable lumbar support. The lumbar adjustor means is supported in the backrest by a support means. Manual actuation of an exterior adjustment knob provides incremental adjustment of the backrest contour. A complicated assembly process is required to connect the lumbar adjustor means and the support means.

Two prior art adjustable lumbar support assemblies structurally similar to Gregory are shown in U.S. Pat. No. 4,678,230 to Winkle, issued July 7, 1989 and U.S. Pat. No. 4,657,304 to Heesch et al, issued Apr. 14, 1987. These prior art assemblies disclose a lumbar adjustor means disposed within a seat backrest for incrementally adjusting the contour of the backrest to provide variable lumbar support. A support means is provided for attachment to the backrest for supporting the lumbar adjustor means within on the backrest. As with. Gregory, these assemblies also require a complicated assembly process to connect the lumbar adjustor means and the support means.

Therefore, the prior art adjustable lumbar support assemblies are deficient in that connection of the lumbar adjustor means and the support means requires a labor-intensive operation which is both time consuming and expensive. Special connectors are fabricated to unite the two elements, and tools are required for proper assembly. It will be appreciated that when used in mass production vehicular seats, extremely large quantities of adjustable lumbar support assemblies must be manufactured. And therefore, when considered together, the additional time and expense required to connect the lumbar adjustor means and the support means becomes significant and costly.

SUMMARY OF THE INVENTION AND ADVANTAGES

The subject invention provides an adjustable lumbar support assembly of the type disposed within a seat backrest for altering the contour of the backrest to provide adjustable lumbar support. The assembly comprises a lumbar adjustor means adapted for inclusion within a seat backrest for incrementally adjusting the contour of the backrest to provide variable lumbar support. A support means is provided for attachment to the backrest for supporting the lumbar adjustor means on the backrest. The invention is characterized by a mechanical locking means for forcibly receiving the lumbar adjustor means on the support means as the lumbar adjustor means is moved into a mechanically interlocked position with the support means to allow rapid assembly of the lumbar adjustor means and the support means as an operational unit to be installed within a seat backrest.

The mechanical locking means of the subject invention provides a unique and advantageous connection of the lumbar adjustor means to the support means. The invention provides an automatic connection of the lumbar adjustor means and the support means simply upon forced movement of the lumbar adjustor means toward a mechanical locked position with the support means so that the assembly may be rapidly assembled and subsequently disposed within a seat backrest. The subject invention provides for a significant reduction in the time required to assemble the elements and hence provides significant savings in cost.

BRIEF DESCRIPTION OF THE DRAWINGS

Other advantages of the present invention will be readily appreciated as the same becomes better understood by reference to the following detailed description when considered in connection with the accompanying drawings wherein:

FIG. 11 is yet another perspective view of the alternative embodiment of the subject invention as shown in FIG. 10.

DETAILED DESCRIPTION OF THE PREFERRED EMBODIMENT OF FIGS. 1-9

Figure 1:
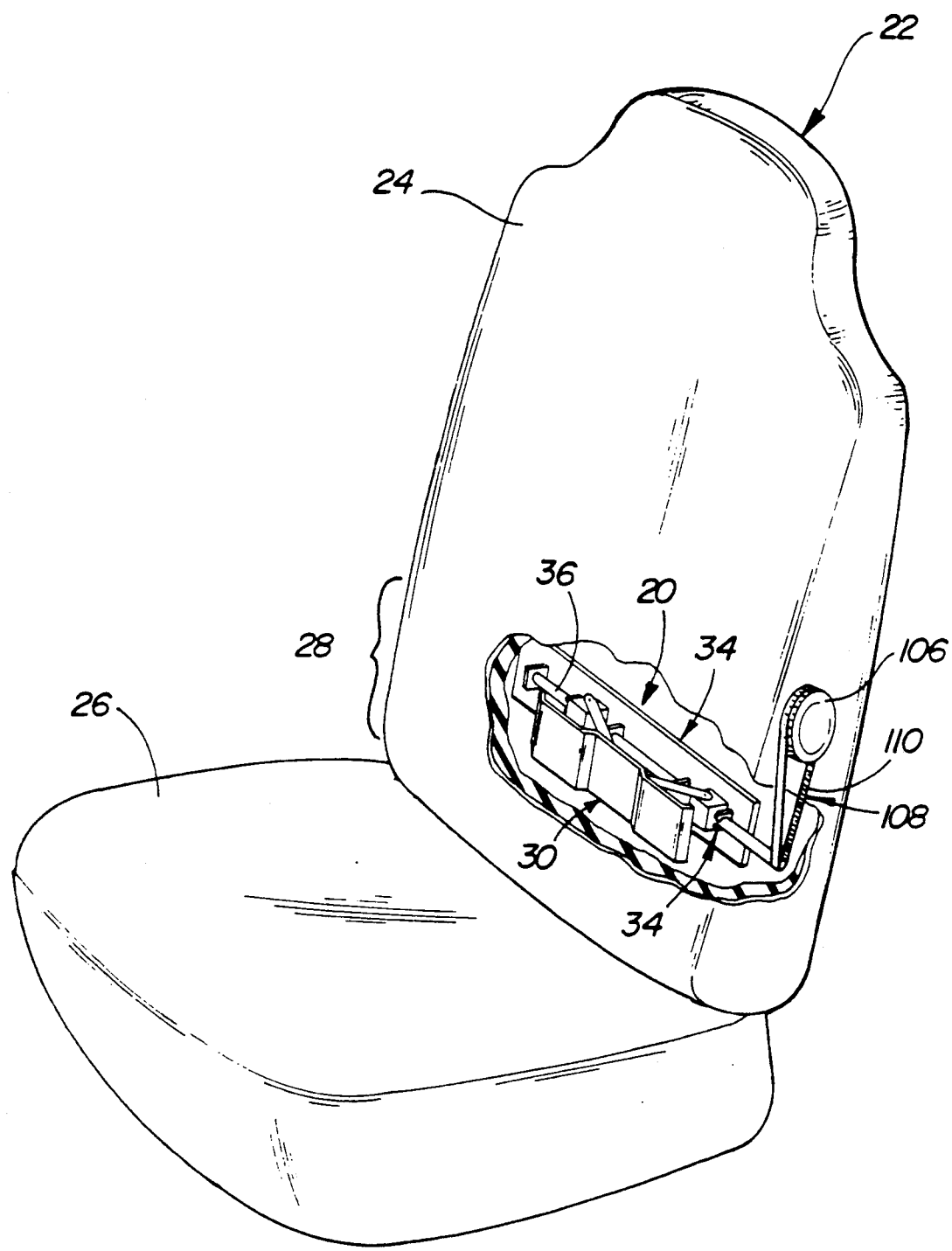
FIG. 1 is an environmental view of the subject invention shown disposed for operation within a vehicular seat.

Referring to FIGS. 1-9, wherein like numerals indicate like or corresponding parts throughout the several views, an adjustable lumbar support assembly is generally shown at 20. A seat assembly is generally indicated at 22 and includes a backrest portion 24 and a seat portion 26. A lumbar region of the backrest 24 is generally represented by the bracketed area 28, as shown in FIG. 1.

The lumbar support assembly 20 is disposed within the backrest 24 for altering the contour of the backrest 24 to provide adjustable lumbar support within the lumbar region 28. The lumbar support assembly 20 includes a lumbar adjustor means, generally indicated at 30, which is enclosed within the seat backrest 24 for incrementally adjusting the contour of the backrest 24 to provide variable lumbar support. The lumbar adjustor means 30 comprises the structure moving within the backrest 24 to physically alter the contour of the backrest 24 inwardly or outwardly such that pressure is applied in various increments to the lumbar region of an occupant in the seat assembly 22. A support means, generally indicated at 32, is provided for attachment to the backrest 24 for supporting the lumbar adjustor means 30 on the backrest 24. Therefore, the support means 32 provides an interface between the lumbar adjustor means 30 and the backrest 24 to support the lumbar adjustor means 30 for movement within the backrest 24.

The improvement of the subject invention comprises a mechanical locking means, generally indicated at 34, for forcibly receiving the lumbar adjustor means 30 on the support means 32 as the lumbar adjustor means 30 is moved into a mechanical interlocked position with the support means 32 to allow rapid assembly of the lumbar adjustor means 30 and the support means 32 as an operational unit to be installed within the backrest 24. That is, the mechanical locking means 34 provides automatic fastening and connecting of the lumbar adjustor means 30 and the support means 32 in response to a forced movement of the lumbar adjustor means 30 into a mechanically interlocked position on the support means 32. The mechanical locking means 34 allows rapid and simple connection of the elements of the subject invention without the need for additional tools or time consuming manufacturing assembly operations.

The lumbar adjustor means 30 includes an elongated screw shaft 36 having a generally horizontal longitudinal axis. The screw shaft 36 is supported on the mechanical locking means 34 for rotation about its longitudinal axis. As best shown in FIGS. 2-6, the screw shaft 36 includes a first set of external thread patterns 38 wound in the right hand direction. That is, the first set of threads 38 are male thread convolutions having a thread propagation tending to axially advance the screw shaft 36 when rotated in a clockwise direction about the longitudinal axis. The screw shaft 36 also includes a second set of external thread patterns 40 which are spaced axially from the first threads 38. The second threads 40 are male thread convolutions having a left hand propagation causing retraction of the screw shaft 36 when rotated in a clockwise direction about its longitudinal axis.

Figure 5:
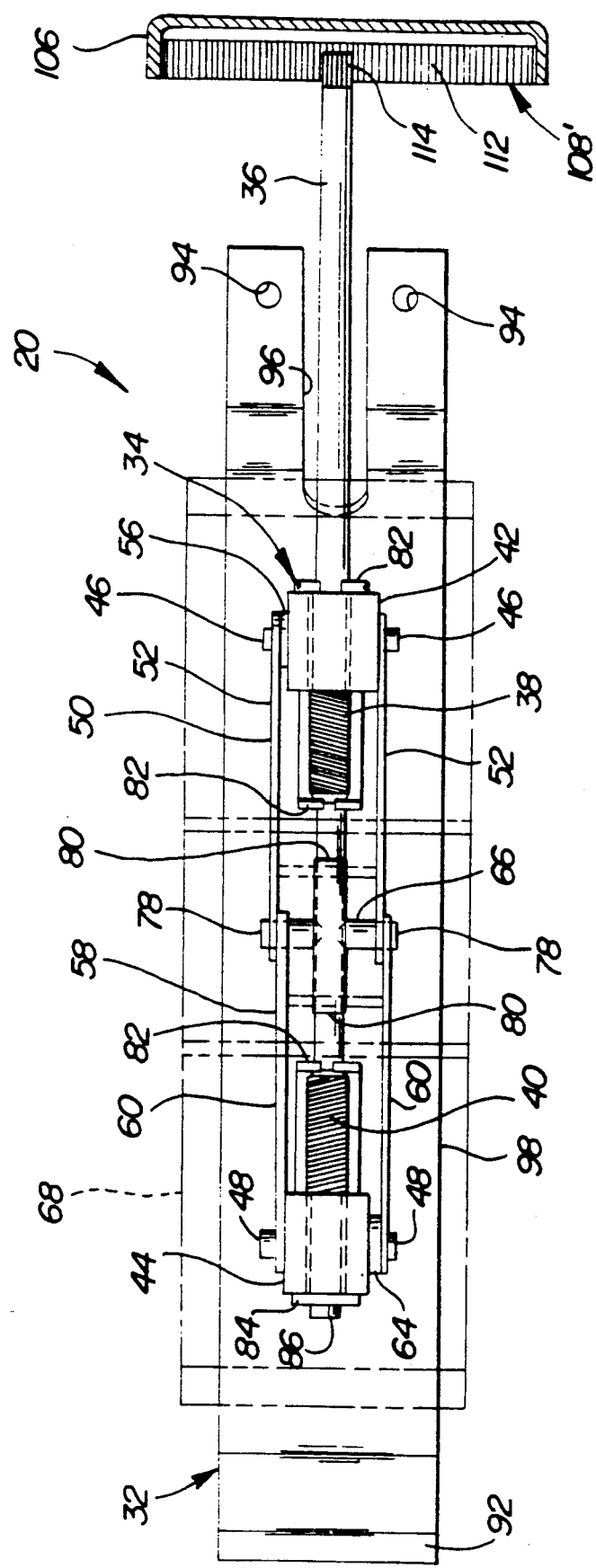
FIG. 5 is a front view of the subject invention shown with the pressure applicator in phantom and the hand crank in cross section.
Figure 6:
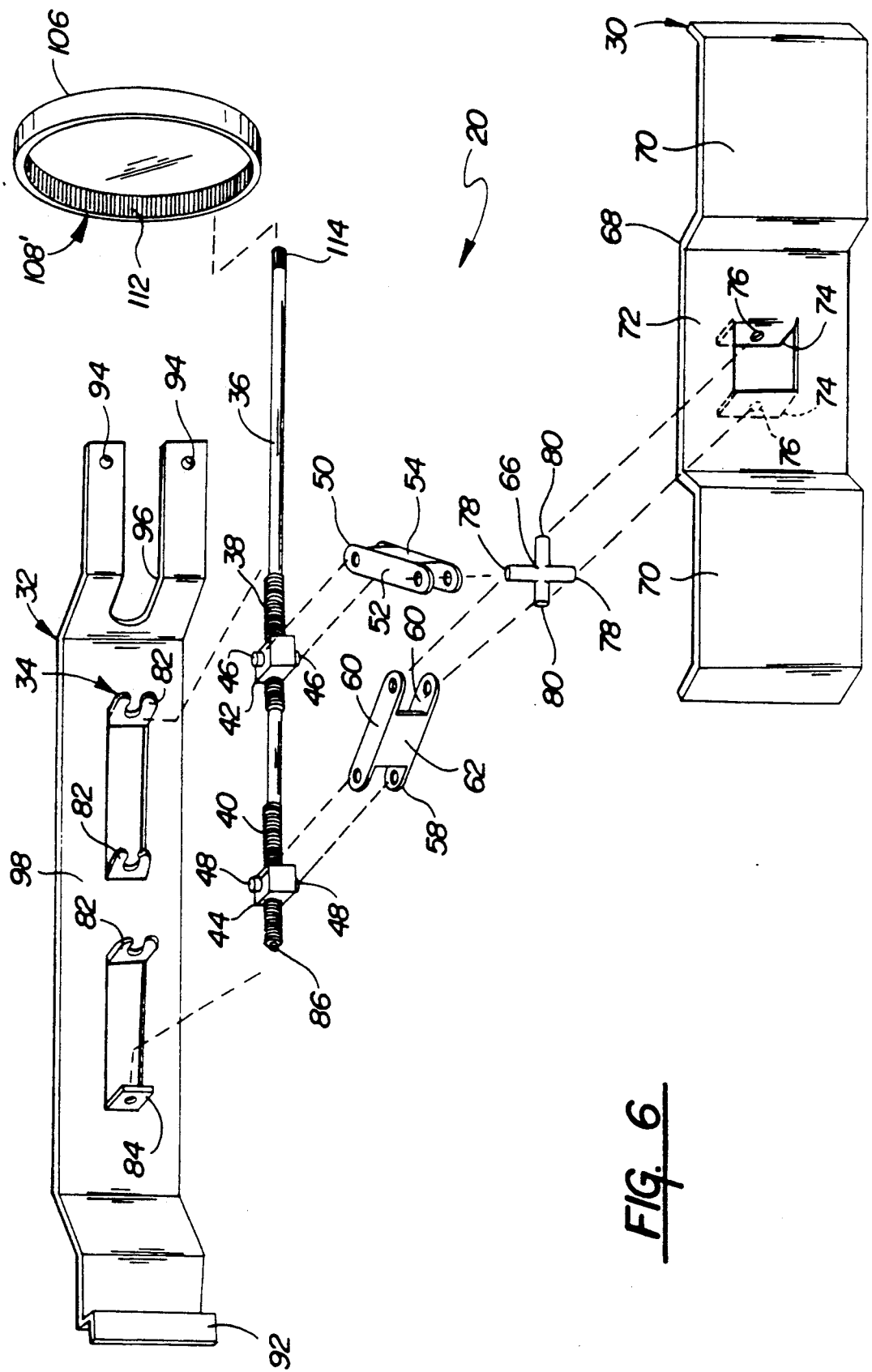
FIG. 6 is an exploded view of the subject invention.

A first nut-like travelling member 42 is disposed in operative engagement with the first threads 38 and supported for non-rotating linear movement along the screw shaft 36. Likewise, a second nut-like traveling member 44 is operatively engaged with the second threads 40 and also supported for non-rotating linear movement along the screw shaft 36. The first 42 and second 44 travelling members, as perhaps best shown in FIG. 2, have a generally cubical shape with an internally threaded bore extending centrally through each member. As best shown in FIGS. 5 and 6, the first travelling member 42 includes a pair of pintles 46 extending therefrom and disposed on opposite sides of the longitudinal axis of the screw shaft 36. By way of reference to the drawing Figures, the pintles 46 extend from the top and bottom surfaces of the cubical first travelling member 42. Similarly, the second travelling member 44 includes a pair of pintles 48 extending therefrom and disposed on opposite sides of the longitudinal axis.

Referring again to FIG. 2, a first link 50 is pivotally connected to the first travelling member 42. The first link 50 has a generally U-shaped cross section comprised of upper and lower parallel struts 52 interconnected by an integral bridge 54. The struts 52 are slightly longer than the bridge 54 such that the distal ends are flexible and resilient when the first link 50 is fabricated from a resilient material such as plastic. Adjacent to the location where the first link 50 is pivotally attached to the first travelling member 42, each of the struts 52 include a hole for pivotally receiving the pintles 46 on the first travelling member 42. For reasons to be described subsequently, a spacer 56 is disposed over the pintle 46 and between one of the struts 52 and the first travelling member 42, as shown in FIG. 5.

Similarly, a second link 58 is pivotally connected to the second travelling member 44. The second link 58 is identical to the first link 50 and includes upper and lower struts 60 maintained spaced and parallel by a connecting bridge 62. A pair of aligned holes in the struts 60 pivotally receive the pintles 48 of the second travelling member 44 for establishing the pivotal connection between the two elements. A spacer 64 is disposed on one of the pintles 48 and positioned between the second travelling member 44 and one of the struts 60, as shown in FIG. 5.

Figure 2:
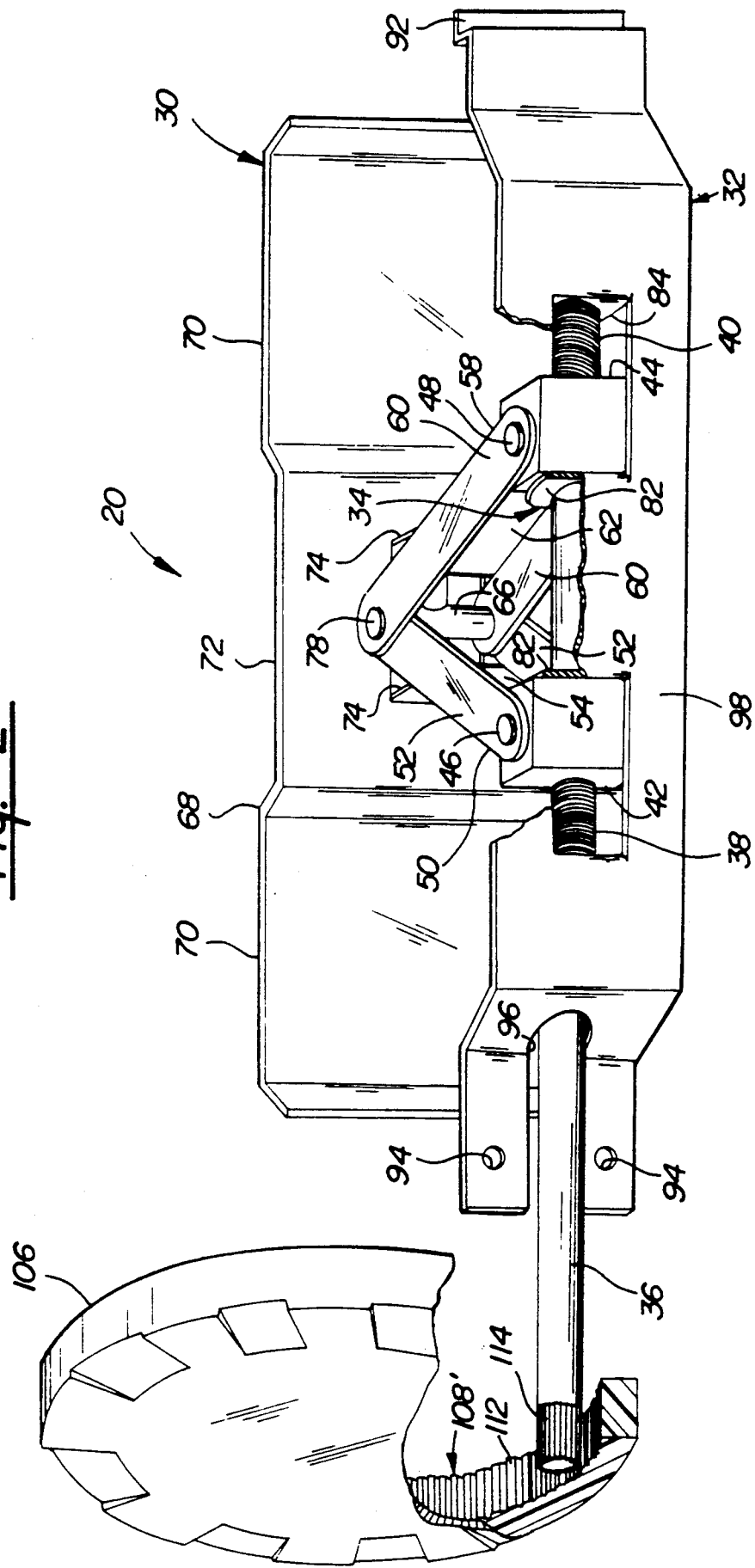
FIG. 2 is a perspective view of the subject invention shown in partial cross section.

The first 50 and second 58 links are pivotally connected to one another at a displaceable joint 66 which is spaced from the first 42 and second 44 travelling members. More particularly, the displaceable joint 66 resembles a cross member to which each of the first 50 and second 58 links are connected in overlapping fashion. As best shown in FIGS. 2 and 5, the first 50 and second 58 links are interleaved with one another at the displaceable joint 66 and, for this reason, the spacers 56, 64 are employed on opposite sides of the respective travelling members 42, 44 to maintain the first 50 and second 58 links in a parallel orientation.

The lumbar adjustor means 30 further includes a substantially rigid pressure applicator 68 for forcibly altering the contour of the backrest 24. The pressure applicator 68 comprises a paddle-shaped member having two sheet-like planar jutting surfaces 70 spaced on opposite sides of a sheet-like planar middle recessed surface 72. Extending rearwardly of the recessed surface 72 are a pair of spaced tabs 74. The tabs 74 extend in generally parallel vertical planes and each include a hole 76, as shown in FIG. 6. The holes 76 of each of the tabs 74 are aligned along a horizontal axis.

It is shown in the Figures, the displaceable joint 66 comprises a universal spider-type joint. That is, two vertically spaced displacement pintles 78 of the displaceable joint 66 engage and pivotally connect the first 50 and second 58 links while two horizontally spaced applicator pintles 80 engage and pivotally support the holes 76 of the tabs 74 such that the pressure applicator 68 is universally pivotally connected to the first 50 and second 58 links.

In the preferred embodiment, the tabs 74 of the pressure applicator 68 are sufficiently flexible and resilient so that the displaceable joint 66 can be inserted into the tab holes 76 without the aid of special tools or disassembly of the elements. Likewise, the first 50 and second 58 links are fabricated from a resilient material which is sufficiently flexible to allow connection to the displaceable joint 66 and the respective first 42 and second 44 travelling members without special assembly techniques. The resilient tabs 74 and links 50, 58 cooperate with the mechanical locking means 34 to allow the entire assembly of the lumbar adjustor means 30 and the support means 32 to be connected together without the requirement of special assembly techniques.

The mechanical locking means 34 includes three resilient prong members 82 extending from a fixed connection on the support means 32, as shown in FIG. 6. The mechanical locking means 34 also includes a socket 84 likewise extending from a fixed connection on the support means 32. The prongs 82 and socket 84 are horizontally aligned on the support means 32 and extend outwardly therefrom in parallel vertical planes. The socket 84 is adapted to receive and rotatably support a terminal end 86 of the screw shaft 36. The prongs 82, on the other hand, forcibly receive the screw shaft 36 at spaced locations and support the screw shaft 36 for rotation about its longitudinal axis.

Figure 7:
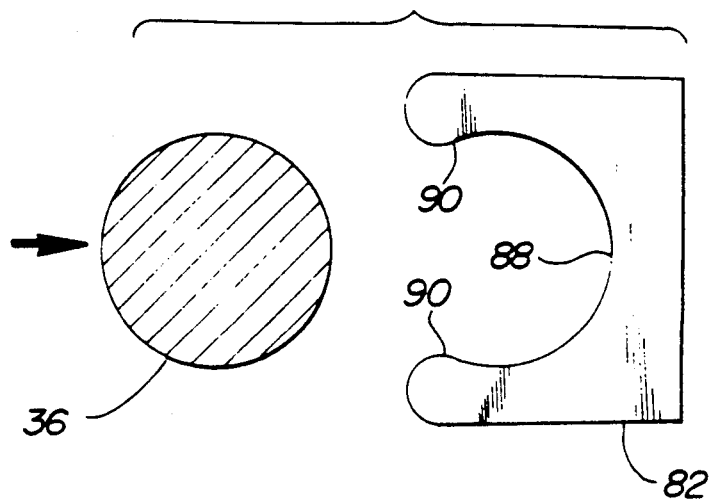
FIG. 7 is an enlarged view of the screw shaft and the mechanical locking means of the subject invention shown in a disconnected relationship.
Figure 8:
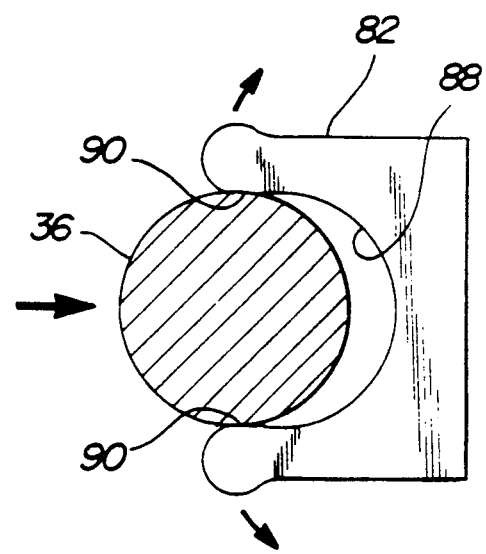
FIG. 8 is a view as in FIG. 7 showing the screw shaft being forcibly received in the mechanical locking means.
Figure 9:
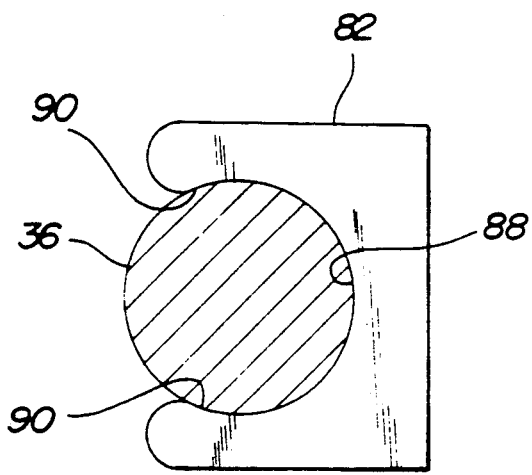
FIG. 9 is a view in FIGS. 7 and 8 showing the screw shaft forcibly received in the mechanical locking means in a mechanical interlock position.

As best shown in FIGS. 7-9, the prongs 82 have a circular inner bearing surface 88 matingly shaped to receive the screw shaft 36. Retaining tips 90 flex outwardly as the screw shaft 36 is forcibly moved toward the inner bearing surface 88, as shown in FIG. 8. Once the screw shaft 36 is moved contiguous the inner bearing surface 88, the retaining tips 90 flex back inwardly and support the screw shaft 36 for rotation, as shown in FIG. 9.

Therefore, during assembly of the subject lumbar adjustor means 30 and support means 32, the first 42 and second 44 travelling members are first assembled onto the respective first 38 and second 40 threads, with the respective pintles 46, 48 extending in vertical directions. The first 50 and second 58 links are then forcibly received on the respective pintles 46, 48 of the first 42 and second 44 travelling members. The first 50 and second 58 links are then forcibly received on the displacement pintles 78 of the displaceable joint 66. The applicator pintles 80 are next forcibly received in the holes 76 of the tabs 74 of the pressure applicator 68. With the lumbar adjustor means 30 thus assembled, the terminal end 86 of the screw shaft 36 is inserted into the socket 84 and the screw shaft 36 is moved toward the prongs 82 such that the screw shaft 36 is forcibly received in the prongs 82 and supported therein for rotation.

The support means 32 comprises a plate-like member having a fastening lip 92 disposed at one end thereof and a pair of spaced openings 94 at the other end thereof. An elongated groove 96 extends horizontally into the support means 32, between the two openings 94, through which the screw shaft 36 may pass. A backset plate 98 is integrally disposed intermediate the fastening lip 92 and the openings 94 and supports the prongs 82 and socket 84. When the screw shaft 36 is rotatably supported in the prongs 82 and socket 84, the first 42 and second 44 travelling members engage the backset plate 98. When the screw shaft 36 is rotated in the prongs 82 and socket 84, the backset plate 98 prevents rotation of the travelling members 42, 44 and thereby restrains the travelling members 42, 44 to linear movement along the screw shaft 36.

Figure 3:
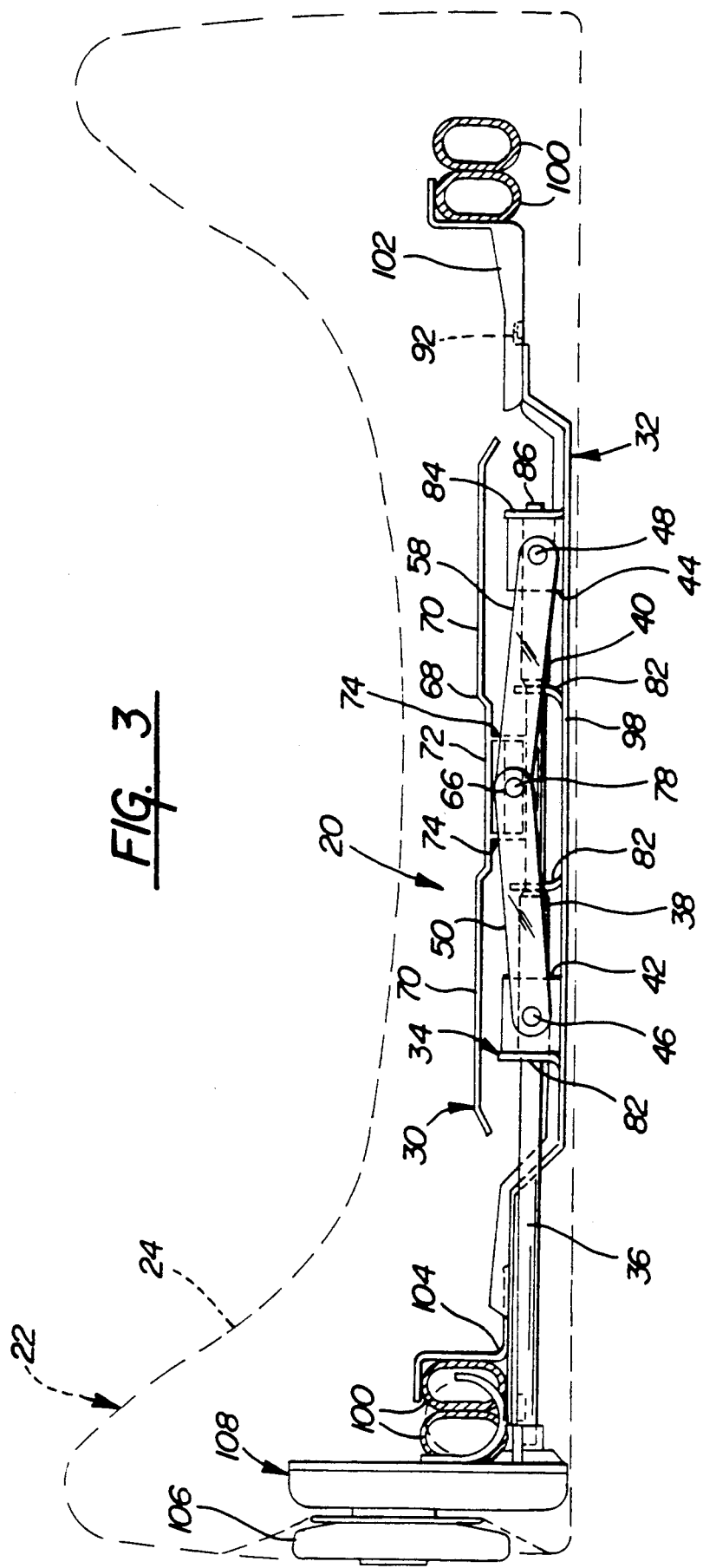
FIG. 3 is a top view of the subject invention shown in a collapsed position and disposed within a vehicular seat.
Figure 4:
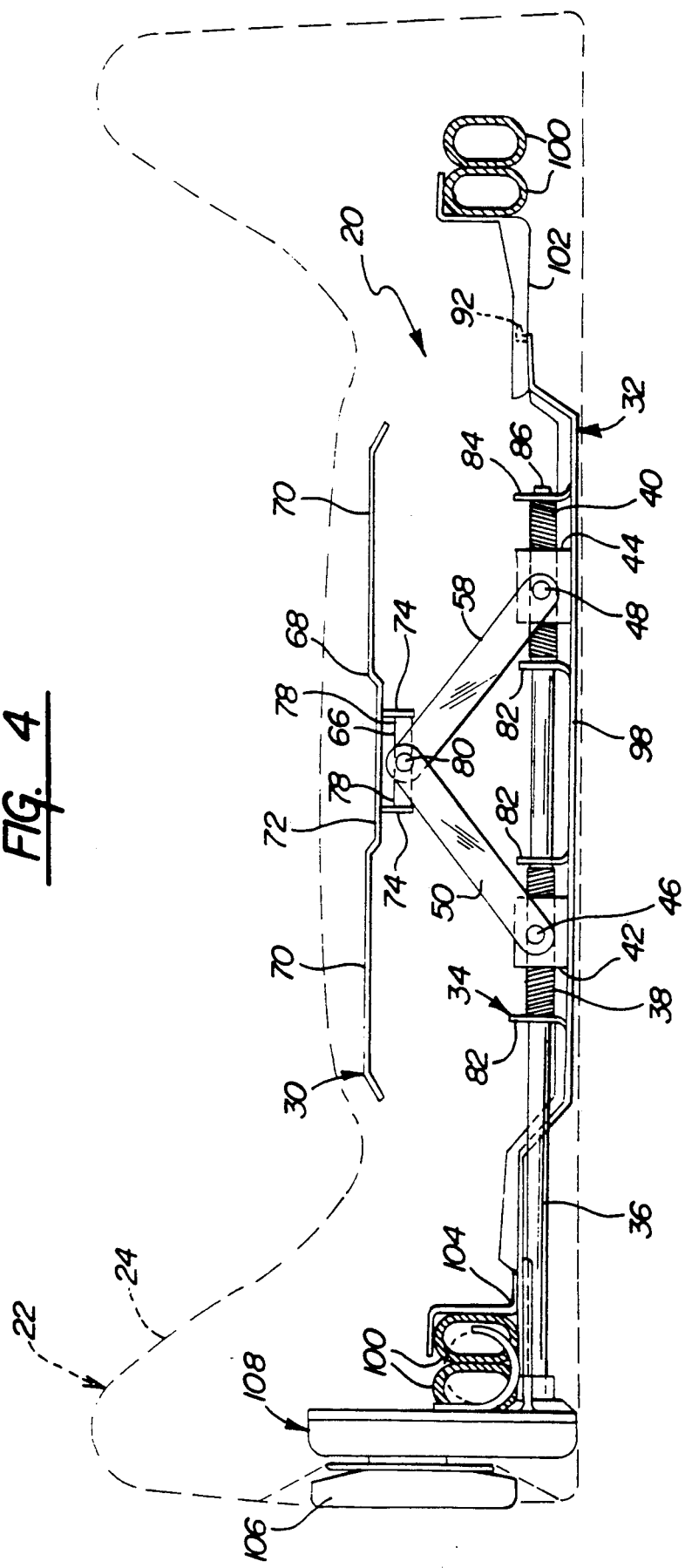
FIG. 4 is a top view of the subject invention as in FIG. 3 and shown in an extended position.

Referring now to FIGS. 3 and 4, the backrest 24 is shown including structural frame members 100 each having an oval tubular cross section. As viewed from FIGS. 3 and 4, the frame members 100 on the right side of the backrest 24 include an inwardly extending mounting bracket 102. Disposed in the mounting bracket 102 is a vertically extending slot adapted to receive the fastening lip 92 of the support means 32. Extending inwardly from the left side frame members 100 is a similar mounting bracket 104. The mounting bracket 104 includes a pair of vertically spaced holes adapted to align with the openings 94 in the support means 32. Therefore, when the support means 32 is mounted to the mounting brackets 102, 104, fasteners of some conventional type are positioned through the openings 94 and the corresponding holes in the mounting bracket 104 to fixedly support the assembly 20 in the backrest 24.

As shown in FIGS. 1 and 2, a rotary input comprising a hand crank 106 is provided for rotating the screw shaft 36. A rotation multiplier means 108, 108' is provided in association with the hand crank 106 for rotating the screw shaft 36 in the mechanical locking means 34 at a higher rotational velocity than the hand crank 106. Two alternative embodiments of the rotation multiplier means 108, 108' are shown in FIGS. 1 and 2. In FIG. 1, the rotation multiplier means 108 is shown with a belt pulley 110 operatively engaged to the hand crank 106 and disposed for operative engagement with the screw shaft 36. Alternatively, in FIG. 2, the rotation multiplier means 108' is shown with the hand crank 106 having an internal annular gear set 112 disposed in matingly engagement with a pinion gear 114 extending integrally from the screw shaft 36. In either version of the rotation multiplier means 108, 108', the hand crank 106 is supported for rotation on the side of the backrest 24 in a conventional manner.

ALTERNATIVE EMBODIMENT OF FIGS. 10 AND 11

Figure 10:
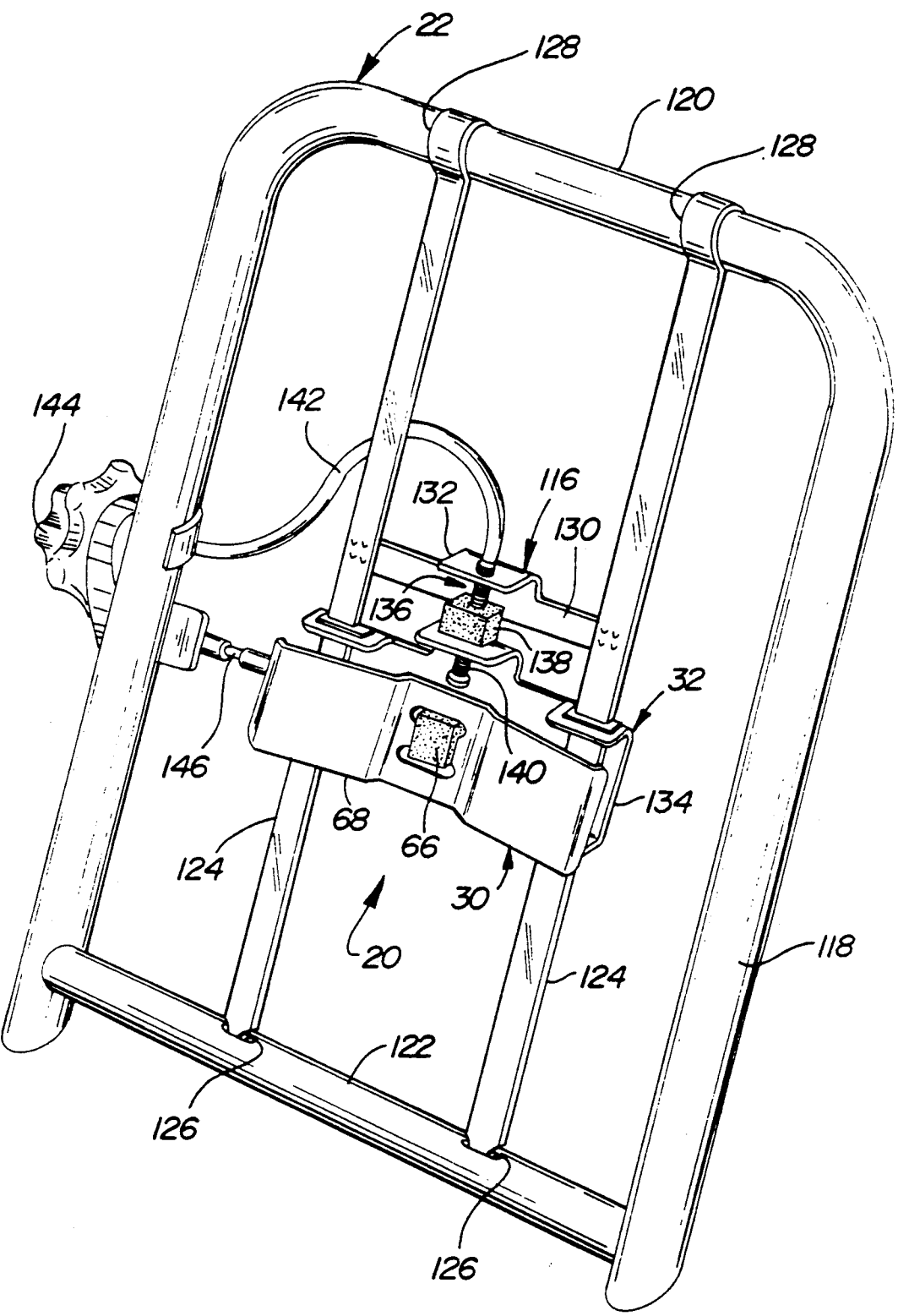
FIG. 10 is a perspective view of an alternative embodiment of the subject invention including a vertical adjustment means.

Referring to FIGS. 10 and 11, an alternative, or modified, version of the support means 32' is shown including a vertical adjustment means, generally indicated at 116, for adjusting the lumbar adjustor means 30 vertically within the backrest 24. In FIG. 10, a tubular backrest frame 118 is shown including a horizontal upper cross piece 120 and a vertically spaced lower cross piece 122.

Two spaced apart vertical guide members 124 are fixed to the backrest frame 118. More specifically, each of the vertical guide members 124 include a tongue disposed at the lower end thereof and adapted to be received in a slot 126 in the lower cross piece 122. A resilient spring clip 128 is integrally formed at the upper end of each vertical guide member 124. The upper cross piece 120 is shaped and so disposed as to be forcibly received in the clip 128 and fixedly supported therein in a mechanically interlocked position. Therefore, the vertical guide members 124 are supported between the upper 120 and lower 122 cross pieces of the backrest frame 118. A spanner 130 is fixedly connected to and extends horizontally between each of the vertical guide members 124, midway between the upper 120 and lower 122 cross pieces. A plate-like arm 132 is disposed in a generally horizontal plane and extends forwardly from the spanner 130.

The support means 32' further includes a carriage 134 which is moveably connected to the vertical guide members 124, as shown in FIG. 10. The carriage 134 supports the mechanical locking means 34 and, thus, the screw shaft 36, links 50, 58 and the pressure applicator 68. As the carriage 134 is moveable linearly along the vertical guide members 124, the pressure applicator 68 is likewise adjustable vertically within the backrest to provide lumbar support at different vertical positions.

A worm mechanism, generally indicated at 136, operatively interconnects the vertical guide members 124 and the carriage 134, and more specifically the spanner 130 and the carriage 134. The worm mechanism 136 includes a nut 138 fixedly attached to the carriage 134 and a screw element 140 rotatably supported on the arm 132 of the spanner 130. Therefore, as the screw element 140 rotates, it displaces the nut 138, and hence the carriage 134, linearly along the vertical guide members 124.

The screw element 140 is connected to a flexible motion transmitting core element supported for rotation within a conduit 142. The conduit 142, and hence the core element, extend from the arm 132 to a remote rotary actuator 144. In the preferred embodiment shown in FIG. 10, the remote rotary actuator 144 is coaxially located with the hand crank 106 to provide a compact assembly on the exterior of the backrest 24. Because the carriage 134, and hence the screw shaft 136, are moveably disposed within the backrest, the screw shaft 36 must also be connected to the hand crank 106 through a flexible motion transmitting assembly as indicated at 146.

The subject invention is particularly advantageous when mass produced for high volume sale due to the decreased assembly time required to operatively connect the various moving elements. As each of the connected elements are snap-fit together, special tools are not required. Further, as best shown in FIG. 3, the subject invention has a very thin profile and therefore nests neatly within the backrest 24. Further, because many of the elements are fabricated from an elastomeric polymeric material, additional weight savings over prior art assemblies can be realized.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An adjustable lumbar support assembly (20) of the type disposed within a seat backrest (24) for altering the contour of the backrest (24) to provide lumbar support, said assembly (20) comprising: lumbar adjustor means (20) adapted for inclusion within a seat backrest (24) for incrementally adjusting the contour of the backrest (24) to provide variable lumbar support; support means (32, 32') for attachment to the backrest (24) for supporting said lumbar adjustor means (30) on the backrest (24); and characterized by mechanical locking means (34) for forcibly receiving said lumbar adjustor means (30) on said support means (32, 32') as said lumbar adjustor means (30) is moved into a mechanical interlocked position with said support means (32, 32') to allow rapid assembly of said lumbar adjustor means (30) and said support means (32, 32') to allow rapid assembly of said lumbar adjustor means (30) and said support means (32, 32') as an operational unit to be installed within a seat backrest (24), said mechanical locking means (34) including at least one resilient prong member (82) extending from said support means (32, 32').

2. An assembly (20) as set forth in claim 1 further characterized by said lumbar adjustor means (30) including an elongated screw shaft (36) having a longitudinal axis and supported on said mechanical locking means (34) for rotation about said longitudinal axis.

3. An assembly (20) as set forth in claim 2 further characterized by said screw shaft (36) including a first set of thread patterns (38) disposed in a right hand propagation and an axially spaced second set of thread patterns (40) disposed in a left hand propagation.

4. An assembly (20) as set forth in claim 3 further characterized by said lumbar adjustor means (30) including a first travelling member (42) disposed in operative engagement with said first set of thread patterns (38) and supported for non-rotating linear movement along said screw shaft (36), and a second travelling member (44) disposed in operative engagement with said second set of thread patterns (40) supported for non-rotating linear movement along said screw shaft (36).

5. An assembly (20) as set forth in claim 4 further characterized by said lumbar adjustor means (30) including a first link (50) pivotally connected to said first travelling member (42) and a second link (58) pivotally connected to said second travelling member (44) with said first link (50) and said second link (58) being pivotally connected to one another at a displaceable joint (66) spaced from said first (42) and second (44) travelling members.

6. An assembly (20) as set forth in claim 5 further characterized by said lumbar adjustor means (30) including a substantially rigid pressure applicator (68) for forcibly altering the contour of the backrest (24).

7. An assembly (20) as set forth in claim 6 further characterized by said lumbar adjustor means (30) including a universal joint connection (66) between said pressure applicator (68) and said first (50) and second (58) links.

8. An assembly (20) as set forth in claim 7 further characterized by said first link (50) and said second link (58) being fabricated from a resilient material.

9. An assembly (20) as set forth in claim 7 further characterized by said first (42) and second (44) travelling members each including a pair of pintles (46, 48) extending therefrom and disposed on opposite sides of said longitudinal axis.

10. An assembly (20) as set forth in claim 9 further characterized by said universal joint connection (66) including a pair of displacement pintles (78) extending outwardly toward and pivotally connecting to both of said first (50) and second (58) links, and a pair of applicator pintles (80) extending outwardly toward and pivotally connecting to said pressure applicator (68).

11. An assembly (20) as set forth in claim 10 further characterized by said pressure applicator (68) including two inwardly extending resilient tabs (74) each having a pintle receptacle (76) for pivotally engaging said pair of applicator pintles (80).

12. An assembly (20) as set forth in claim 11 further characterized by said lumbar adjustor means (30) including rotation multiplier means (108, 108') having a rotary input (106) for rotating said screw shaft (36) in said mechanical locking means (34) at a higher rotational velocity and said rotary input (106).

13. An assembly (20) as set forth in claim 12 further characterized by said rotation multiplier means (108') including a hand crank (106) having an internal annular gear set (112) disposed in mating engagement with a pinion gear (114) extending from said screw shaft (36).

14. An assembly (20) as set forth in claim 12 further characterized by said rotation multiplier means (108) including a hand crank (106) having a belt pulley (110) operatively engaged thereto and disposed for operative engagement with said screw shaft (36).

15. An assembly (20) as set forth in either of claims 2 or 12 further characterized by said support means (32, 32') including vertical adjustment means (116) for adjusting said lumbar adjustor means (30) vertically within the backrest (24).

16. An assembly (20) as set forth in claim 15 further characterized by said support means (32, 32') including at least one vertical guide member (124) for fixed attachment to the backrest (24).

17. An assembly (20) as set forth in claim 16 further characterized by said support means (32, 32') including a carriage (134) moveably connected to said vertical guide member (124) and supporting said mechanical locking means (34).

18. An assembly (20) as set forth in claim 17 further characterized by said vertical adjustment means (116) including a worm mechanism (136) operatively interconnecting said vertical guide member (124) and said carriage (134).

19. An assembly (20) as set forth in claim 18 further characterized by said vertical adjustment means (116) including a remote actuator (144) for operating said worm mechanism (136) from a remote location.

20. An assembly (20) as set forth in claim 19 further characterized by said remote actuator (144) including a flexible motion transmitting core element supported for rotation within a conduit (142).

21. An assembly (20) as set forth in claim 20 further characterized by said worm mechanism (136) including a nut (138) fixedly attached to said carriage (134) and a screw element (140) fixedly connected to said flexible motion transmitting core element.

22. An adjustable lumbar support assembly (20) of the type disposed within a seat backrest (24) for altering the contour of the backrest (24) to provide lumbar support, said assembly (20) comprising: an elongated screw shaft (36) having a first set of right hand thread patterns (38) and a second set of left hand thread patterns (40); support means (32,32') for rotationally supporting said screw shaft (36); a first travelling member (42) disposed in operative engagement with said first thread pattern (38); a second travelling member (44) disposed in operative engagement with said second thread pattern (40); a first link (50) pivotally connected to said first travelling member (42); a second link (58) pivotally connected to said second travelling member (44); a pressure applicator (68); a universal joint (66) interconnecting said first link (50) and said second link (58) and said pressure applicator (68); and at least one resilient prong member (82) extending from said support means 32, 32') for forcibly receiving said screw shaft (36) in a mechanically interlocked position upon said support means (32,32') to rotatably support said screw shaft (36) and allow rapid assembly of said screw shaft (36) as in operational unit within a seat backrest (24).

* * * * *